Patented Feb. 23, 1926.

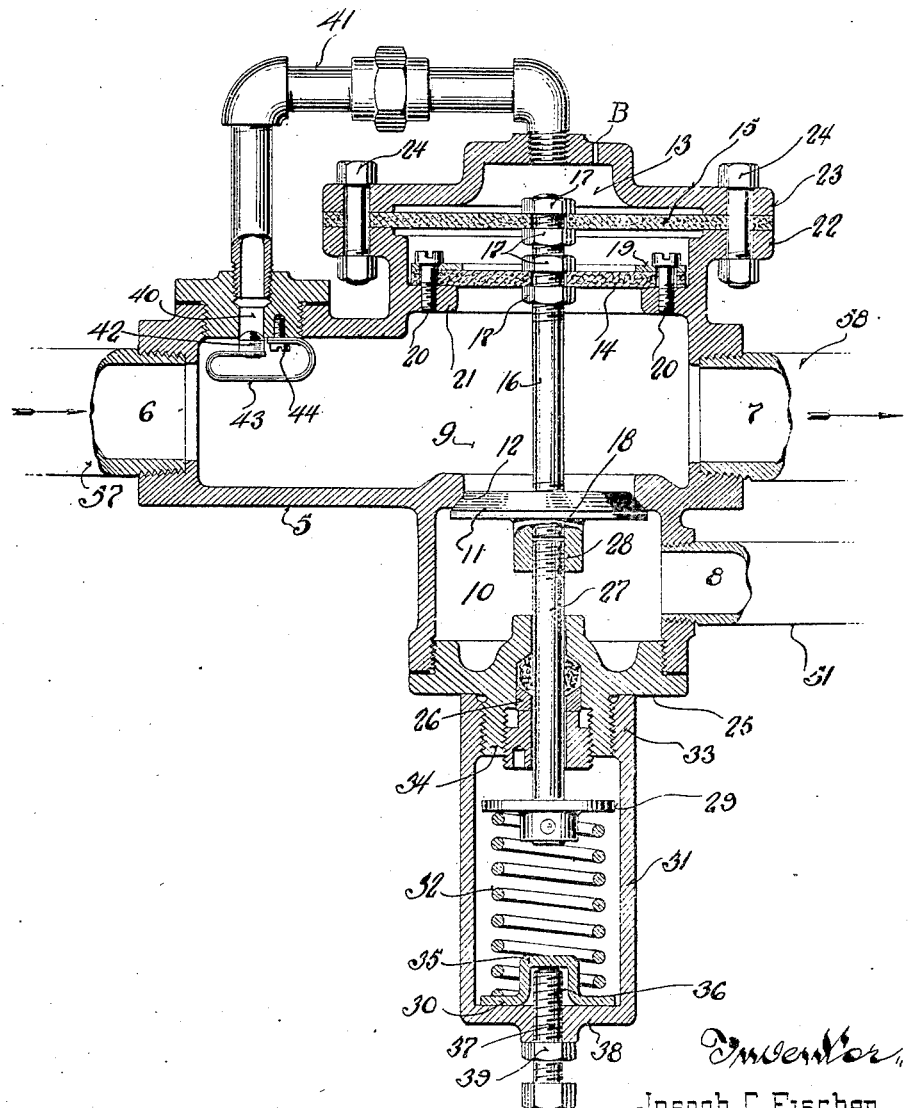

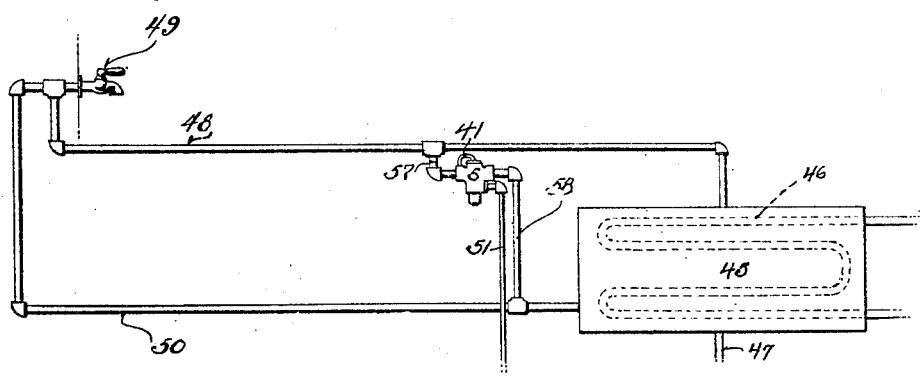
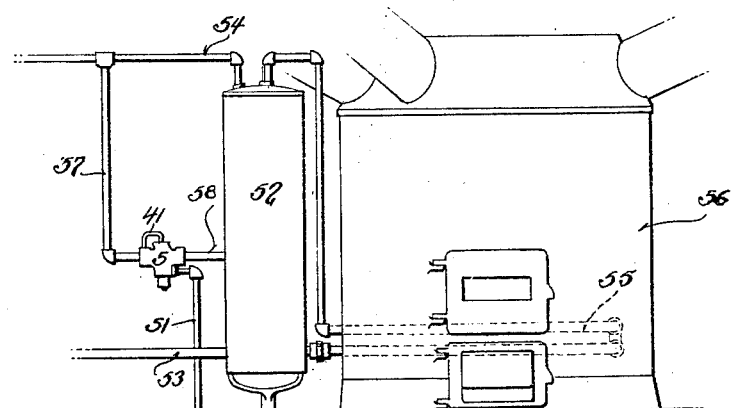

1,574,075

UNITED STATES PATENT OFFICE.

JOSEPH C. FISCHER, OF MILWAUKEE, WISCONSIN.

WATER TEMPERATURE REGULATOR AND PRESSURE-CONTROL VALVE.

Application filed August 27, 1923. Serial No. 659,618.

*To all whom it may concern:*

Be it known that I, JOSEPH C. FISCHER, a citizen of the United States, and resident of Milwaukee, in the county of Milwaukee and State of Wisconsin, have invented new and useful Improvements in Water Temperature Regulators and Pressure-Control Valves, of which the following is a description, reference being had to the accompanying drawings, which are a part of this specification.

This invention relates to certain new and useful improvements in steam and plumbing fixtures and refers more particularly to a fixture especially adapted for use in connection with hot water systems.

In sanitariums, hospitals and other places, it is often desirous to give patients long baths of substantially constant temperature, and much difficulty has been experienced in that no means has been devised for preventing the temperature of the water exceeding a desired maximum, to thus safeguard the patient against scalding.

Difficulty has also been experienced in that the temperature of the water at times reaches such a degree as to burn out the faucet packings and oftentimes generate steam backing up through the line to the city meter destroying the discs, and into the flush valves of toilets, resulting in severe damage.

Having the above and other objections in mind, it is a primary object of my invention to provide means for safeguarding against excessive pressure in the hot water line and the water exceeding a predetermined temperature to thus prevent injury to the faucet packings and the backing up of the water to the city meter and into the cold water line.

It is another object of this invention to provide a shunt from the hot water line back to the boiler or tank through which water circulates and actuates a release upon an increase in temperature of the water beyond a predetermined degree.

This invention has for another object to provide means operable upon an increase in temperature of the water beyond a predetermined degree to connect the hot water line with the sewer or other source of discharge to prevent injury in the line.

The law in most cities requires each boiler or tank having a capacity of 500 gallons or over to be equipped with a safety or pressure release valve adapted to operate upon the pressure exceeding a predetermined degree, and it is another object of this invention to provide a temperature regulator which also provides a pressure release or safety valve.

It is a further object of this invention to provide an improved device of the character described wherein the employment of a valve gland for the valve actuating rod is eliminated, thus reducing friction to a minimum and increasing the sensitiveness of the device.

A more specific object of this invention resides in the provision of a double diaphragm for actuating the release valve.

And a still further object of this invention resides in the provision of a device of the character described, the use of which may be greatly varied and which will perform its function in a highly satisfactory manner.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a view, partly in elevation and partly in vertical longitudinal section, illustrating the interior construction of my improved device;

Figure 2 is a diagrammatic view illustrating the manner of connecting my improved device in a hot water system of that type employing a steam heated drum or tank; and Figure 3 is a diagrammatic view illustrating the manner of connecting my improved device in a hot water system of that type employed in the average home.

Referring now more particularly to the accompanying drawings, in which like numerals designate like parts throughout the several views, the numeral 5 designates a casting having an inlet 6 and two outlets 7 and 8, the inlet 6 and outlet 7 being connected at all times through the main chamber or passage 9 of the casting. The outlet 8 leads from a chamber 10, which is normally closed off from the passage 9 by a valve 11 yieldably held in engagement with a seat 12 surrounding a port connecting chamber 10 with passage 9 by means to be later described.

Disposed above valve 11, and in axial alignment therewith, is a diaphragm chamber 13 in which a relatively small diaphragm 14 and a relatively large diaphragm 15 are mounted. One end of a valve stem 16 is secured to the diaphragms by lock-nuts, or other means, 17, and the other end of the stem is threaded in valve 11, as at 18. Diaphragm 14 is of any suitable design or construction and is mounted by a retaining ring 19 and attaching screws 20 which confine the periphery of the diaphragm between the ring 19 and an inwardly projecting flange 21. The larger diaphragm 15 has its periphery confined between a laterally projecting flange 22 on the casting and a removable head 23 removably secured to flange 22 by bolts 24.

The surface area of the diaphragms is preferably considerably greater than that of valve 11, and in the drawings the proportions are approximately six to one, although this ratio may be varied according to the conditions in the system in which my improved device is incorporated. The use of a compound diaphragm eliminates the necessity of providing a valve gland for the rod 16, thus reducing friction to a minimum and providing an instrument of increased sensitiveness.

The bottom of chamber 10 is closed by a removable cap or cover 25 provided with a central valve gland or stuffing box 26 through which passes a rod 27, having its inner end threaded in the valve 11, as at 28, and its lower end provided with a cap or disc 29 between which, and a cap 30 mounted in a spring housing 31, is confined a spring 32. The housing 31 is removably secured to cap 25, and in the present embodiment its upper end 33 is internally threaded and engaged with a threaded boss 34 formed on cap 25. The disc 30 is provided with a central boss or enlargement 35 for centering the spring thereon and providing a recess 36 in its under-face for receiving a screw 37 threaded through the end 38 of the housing. The tension of the spring 32, and consequently the pressure required in chamber 13 or against valve 11 to open the same, as hereinafter described, is readily adjusted by the screw 37, which is releasably locked by a nut 39.

A bypass or opening 40 leads from the chamber or passage 9, adjacent inlet 6, and is connected with chamber 13 by suitable tubing or piping 41, bypass 40 being normally closed by a valve member 42 carried by a thermostatic member 43. In the present embodiment, member 43 is in the form of a bi-metallic strip carrying the valve at one end and having its other end secured to the casting by a removable screw 44.

In Figure 2 is diagrammatically illustrated a hot water system of the type employed in institutions requiring a large volume of heated water in which 45 designates a water tank or drum adapted to be heated by a steam coil 46 connected with a source of supply, not shown. The tank 45 has the usual cold water intake 47 and the hot water outlet 48 which leads to the faucets 49, a return line 50 being provided from the farthermost point in the system in order to insure an instant supply of hot water at the farthest faucet when the same is opened. My improved fitting in this type of installation is connected or shunted across the lines 48 and 50, the inlet 6 being connected with the line 48, the outlet 7 with the line 50 and the outlet 8 with a sewer or any suitable place of discharge by a pipe 51.

In Figure 3 is diagrammatically illustrated an installation such as is employed in the average household in which the water tank 52 has the usual cold water supply 53 and a hot water outlet 54 leading to the faucets, not shown, the water within the tank being heated by a coil 55 mounted within the fire box of a furnace or other place 56 and having one end connected with the top and the other with the bottom of the tank. In this type of system my device has its inlet 6 connected with the line 54 by a pipe 57, its outlet 7 connected with the tank by a pipe 58, and the outlet 8 connected with a sewer or any other point of discharge, not shown, by the pipe 51.

As the operation of my device is substantially the same irrespective of the type of installation with which it is employed, its operation in connection with that form of installation illustrated in Figure 2 only will be described.

The tension of the spring 32 is set by the screw 37 and the thermostatic member 43 is set to actuate under the desired conditions. Assuming the normal maximum temperature of the water desired to be 180 degrees Fahrenheit, the setting of the thermostatic member is such that when this temperature is exceeded to any set degree, as for instance by ten degrees, valve 42 will be disengaged from the bypass 40 and the water permitted to flow from chamber 9 to chamber 13 exerting a pressure on the double diaphragm and opening valve 11 against its spring 32. The system is then partially drained through outlet 8 into the sewer or any other place until the temperature of the water again reaches normal, when the thermostatic member 43 closes valve 42 permitting spring 32 to return valve 11 to its closed position. A bleed B is provided in the head 23 communicating with the diaphragm chamber 13 to insure the unhindered return of the diaphragm to normal position by the spring 32, upon closing of the by-pass 40.

My improved device not only functions as a temperature regulator, but in the event the pressure within the system exceeds a predetermined degree, valve 11 is opened as, pressure being accompanied by a raise in temperature, the device operates as above described, permitting the pressure to be released, whereby the device functions both as a pressure relief or safety valve and a temperature regulator.

From the foregoing description taken in connection with the accompanying drawings, it will be readily apparent to those skilled in the art to which an invention of this character appertains that I provide an improved device which is capable of use with any type of installation to function as a water temperature regulator and a pressure relief or safety valve, and one which may be readily applied to installations now in use or to installations at the time of their construction, and a device which may be manufactured at a relatively low figure and one which after once installed will not necessitate attention.

What I claim as my invention:

1. A device of the character described, a member having an inlet, a main outlet and an auxiliary discharge outlet, valve means normally closing said auxiliary discharge outlet, said inlet and main outlet communicating whereby fluid may flow from the inlet to the main outlet, means in said member and sensitive to temperature changes, and means operable upon the temperature of the fluid flowing through said member exceeding a predetermined degree to open said valve means and permit the fluid to flow through said auxiliary outlet.

2. A device of the character described, comprising a member having an inlet, a main outlet and an auxiliary discharge outlet, valve means normally closing said auxiliary discharge outlet, said inlet and main outlet communicating whereby fluid may flow from the inlet to the main outlet without interruption, means mounted in said member and sensitive to temperature changes, means operable upon the temperature of the fluid flowing through said member exceeding a predetermined degree to open said valve and to permit said fluid to escape through said auxiliary outlet, and means operable upon the temperature of the fluid flowing through said member receding to a predetermined degree to close said valve means and disconnect the auxiliary outlet from said member.

3. A device of the character described, comprising a member having a passage therein provided with an inlet and an outlet, an auxiliary outlet connectable with the passage, valve means normally closing said auxiliary outlet, a diaphragm chamber, a diaphragm mounted therein, means operatively conecting the diaphragm with said auxiliary outlet valve means, a connection leading from said diaphragm chamber to the passage, a valve member normally closing said connection, means operable upon the temperature of the fluid flowing through said passage exceeding a predetermined degree to move the valve member to open position and permit fluid to enter the diaphragm chamber and actuate the diaphragm mounted therein to open said auxiliary outlet valve member.

4. A device of the character described, comprising a member having a passage therein provided with an inlet and an outlet, an auxiliary outlet connectable with said passage, valve means normally closing said auxiliary outlet from the passage, a diaphragm chamber, a diaphragm mounted therein, means operatively connecting said diaphragm with said auxiliary outlet valve means, a connection leading from said diaphragm chamber to said passage, a valve member normally closing said connection, means operable upon the temperature of the fluid flowing through said passage exceeding a predetermined degree to open said valve member and permit fluid to enter the diaphragm chamber and actuate the diaphragm mounted therein to open said auxiliary outlet valve means, said valve member being moved to closed position upon the temperature of the fluid within the chamber receding to a predetermined degree, and means for returning said auxiliary outlet valve means to closed position upon the closing of said first mentioned valve member.

5. A device of the character described, comprising a member having a passage therein, an inlet and an outlet communicating with said passage, an auxiliary outlet connectable with said passage, a valve member normally closing said auxiliary outlet from said passage, a thermostatic member influenced by the temperature of the fluid in said passage, said thermostatic member being actuated upon the temperature of the fluid exceeding a predetermined degree, and means operable upon the actuation of said thermostatic member to move said valve member to open position and permit fluid to flow from the passage through said auxiliary outlet.

6. A device of the character described, comprising a member having a passage therein, an inlet and an outlet communicating with said passage, an auxiliary outlet connectable with said passage, a valve member normally closing said auxiliary outlet from said passage, a thermostatic member influenced by the temperature of the fluid in said passage, said thermostatic member being actuated upon the temperature of the fluid exceeding a predetermined degree, means operable upon the actuation of said thermostatic member to move said valve member to open position and permit fluid to flow from the passage through said auxiliary outlet, said thermostatic member returning to normal position upon the temperature of the fluid in the passage receding to a predetermined degree, and spring means for returning said valve member to closed position upon said thermostatic member resuming its normal position.

7. A device of the character described, comprising a member having a passage therein, an inlet and an outlet communicating with said passage, an auxiliary outlet connectable with said passage, a valve member normally closing said auxiliary outlet from said passage, a thermostatic member influenced by the temperature of the fluid in said passage, said thermostatic member being actuated upon the temperature of the fluid exceeding a predetermined degree, means operable upon the actuation of said thermostatic member to move said valve member to open position and permit fluid to flow from the passage through said auxiliary outlet, said thermostatic member returning to normal position upon the temperature of the fluid receding to a predetermined degree, spring means for returning said valve member to closed position upon said thermostatic member resuming its normal position, and means for adjusting the tension of said spring means.

8. A device of the character described, comprising a member having a passage therein, an inlet and an outlet connected with said passage, said passage having axially aligned openings in opposite walls thereof, an auxiliary chamber communicating with one of said openings, an auxiliary outlet leading therefrom, a valve member normally closing said opening leading to the auxiliary chamber, spring means normally urging said valve member to closed position, a diaphragm chamber disposed above said other opening, a diaphragm mounted in said chamber, means operatively connecting said diaphragm with said valve member, a bypass leading from said diaphragm chamber to said passage, means normally closing said bypass, and means operable upon the temperature of the fluid in the passage exceeding a predetermined degree to open said bypass whereby fluid flows from the passage to the diaphragm chamber and exerts a pressure on said diaphragm to open said valve member against its spring means.

9. A device of the character described, comprising a member having a passage therein, an inlet and outlet connected with said passage, said passage having axially aligned openings in opposite walls thereof, an auxiliary chamber communicating with one of said openings, an auxiliary outlet leading therefrom, a valve member normally closing said opening leading to the auxiliary chamber, spring means normally urging said valve member to closed position, a diaphragm chamber disposed above said other opening a diaphragm mounted in said chamber, means operatively connecting said diaphragm with said valve member, a bypass leading from said diaphragm chamber to the passage, means normally closing said bypass, means operable upon the temperature of the fluid in the passage exceeding a predetermined degree to open said bypass whereby fluid flows from the passage to the diaphragm chamber and exerts a pressure on said diaphragm to open said valve member against its spring means, and means operable to regulate the tension of said spring means.

10. A device of the character described, a member having a passage extended therethrough, an inlet and outlet connected with said passage and through which fluid flows, a diaphragm chamber communicating with said passage, a valve member controlling a port communicating with said passage, a stem carried by said valve member and projecting into said diaphragm chamber, a compound diaphragm mounted in said chamber, means connecting said valve stem with said compound diaphragm, and means operable upon the temperature of fluid in said passage exceeding a predetermined degree to connect said diaphragm chamber with a source of power whereby the compound diaphragm moves the valve member to open position.

In testimony whereof I affix my signature.

JOSEPH C. FISCHER.